United States Patent
Arnone et al.

(10) Patent No.: US 8,144,434 B1
(45) Date of Patent: Mar. 27, 2012

(54) INTEGRATED PIVOT-CARRIAGE FOR IMPROVING PIVOT BONDING PROCESS

(75) Inventors: Gregory Joseph Arnone, San Jose, CA (US); Khaled M. Fawzi, San Jose, CA (US); Ta-Chang Fu, San Jose, CA (US); Robert C. Reinhart, San Jose, CA (US); Jr-Yi Shen, Sunnyvale, CA (US)

(73) Assignee: Hitachi Global Storage Technologies, Netherlands B.V., Amsterdam (NL)

( * ) Notice: Subject to any disclaimer, the term of this patent is extended or adjusted under 35 U.S.C. 154(b) by 0 days.

(21) Appl. No.: 12/941,948

(22) Filed: Nov. 8, 2010

(51) Int. Cl.
*G11B 5/55* (2006.01)
(52) U.S. Cl. .................................... 360/265.6
(58) Field of Classification Search ............... 360/264.2, 360/265.7, 265.9, 266.3, 245.8, 266.1, 265.6
See application file for complete search history.

(56) References Cited

U.S. PATENT DOCUMENTS

| | | | |
|---|---|---|---|
| 5,146,450 A | | 9/1992 | Brooks et al. |
| 5,482,381 A | | 1/1996 | Krum et al. |
| 5,528,092 A | * | 6/1996 | Ohta ........................ 310/67 R |
| 5,529,404 A | | 6/1996 | Robinson et al. |
| 5,596,235 A | | 1/1997 | Yazaki et al. |
| 5,831,355 A | * | 11/1998 | Oku ........................... 310/12.31 |
| 6,097,121 A | * | 8/2000 | Oku ............................... 310/91 |
| 6,299,358 B1 | | 10/2001 | Prater et al. |
| 6,657,822 B1 | | 12/2003 | Nakamura et al. |
| 7,054,111 B2 | | 5/2006 | Dominguez, Jr. et al. |
| 7,341,379 B2 | | 3/2008 | Koyama |
| 2003/0156773 A1 | | 8/2003 | Tsuchiya et al. |
| 2006/0083453 A1 | | 4/2006 | Okumura |
| 2010/0039733 A1 | | 2/2010 | Liu et al. |

FOREIGN PATENT DOCUMENTS

JP 2002078279 A 3/2002

* cited by examiner

*Primary Examiner* — Allen Cao

(57) ABSTRACT

An integrated pivot-carriage for a hard disk drive for improving a pivot bonding process. Embodiments include a pivot-bearing assembly comprising an upper bearing, a lower bearing and a pivot-bearing spacer there between; a carriage comprising: a center-bore within which a pivot-shaft coupled with the pivot-bearing assembly is disposed; and a plurality of pivot-bonding glue dispensers, each of the pivot-bonding glue dispensers comprising: a glue inlet; a glue outlet; and an enclosing wall defining an interior flow passage between the glue inlet and the glue outlet, the interior flow passage configured for conveying bonding glue there through; and a glue receiving region coupling the glue outlet with a bearing of the upper and the lower bearing, the glue receiving region configured for receiving bonding glue dispensed thereto, thereby bonding the pivot-bearing assembly with the carriage.

20 Claims, 6 Drawing Sheets

500

PROVIDES A CARRIAGE INCLUDING A CENTER-BORE, THE CARRIAGE INCLUDING AN INNER SURFACE AND AN OUTER SURFACE
502

↓

MACHINES A PLURALITY OF PIVOT-BONDING ADHESIVE DISPENSERS ONTO THE CARRIAGE, EACH OF THE PIVOT-BONDING ADHESIVE DISPENSER INCLUDING: AN ADHESIVE INLET; AN ADHESIVE OUTLET; AND AN ENCLOSING WALL DEFINING AN INTERIOR FLOW PASSAGE BETWEEN THE ADHESIVE INLET AND THE ADHESIVE OUTLET, THE INTERIOR FLOW PASSAGE CONFIGURED FOR CONVEYING BONDING ADHESIVE THERE THROUGH
504

↓

MACHINES A TACK DISPENSER INCLUDING: A TACK INLET; A TACK OUTLET COUPLED WITH THE RESERVOIR; AND AN ENCLOSING WALL DEFINING A TACK INTERIOR FLOW PASSAGE BETWEEN THE TACK INLET AND THE TACK OUTLET, THE TACK INTERIOR PASSAGE CONFIGURED FOR CONVEYING TACK ADHESIVE THERE THROUGH FROM THE TACK INLET TO THE RESERVOIR, THEREBY BONDING THE CARRIAGE WITH THE PIVOT-BEARING ASSEMBLY
506

↓

PROVIDES A PIVOT-SHAFT COUPLED WITH A PIVOT-BEARING ASSEMBLY, THE PIVOT BEARING ASSEMBLY COMPRISING AN UPPER BEARING, A LOWER BEARING AND A PIVOT-BEARING SPACER THERE BETWEEN
508

↓

PLACING WITH THE CENTER-BORE THE PIVOT-SHAFT COUPLED WITH THE PIVOT-BEARING ASSEMBLY SUCH THAT THE ADHESIVE OUTLET OF EACH OF THE PIVOT-BONDING ADHESIVE DISPENSERS IS ALIGNED ABOVE EACH OF A PLURALITY OF ADHESIVE RECEIVING REGIONS, EACH OF THE PLURALITY OF ADHESIVE RECEIVING REGIONS COUPLING THE ADHESIVE OUTLET WITH A PORTION OF A BEARING OF THE UPPER AND THE LOWER BEARING, THE PLURALITY OF ADHESIVE RECEIVING REGIONS CONFIGURED FOR RECEIVING THE BONDING ADHESIVE DISPENSED THERETO, THEREBY BONDING THE PIVOT-BEARING ASSEMBLY WITH THE CARRIAGE
510

↓

SECURES THE INTEGRATED PIVOT-CARRIAGE IN A HORIZONTAL POSITION SUCH THAT THE TACK INLET OF EACH OF THE PLURALITY OF PIVOT-BONDING ADHESIVE DISPENSERS IS FACING UPWARDS
512

↓

INJECTS, FROM A POSITION ABOVE THE INTEGRATED PIVOT-CARRIAGE, AN AMOUNT OF TACK ADHESIVE INTO THE TACK DISPENSER, SUCH THAT TACK ADHESIVE FLOWS THROUGH THE TACK INTERIOR FLOW PASSAGE FROM THE TACK INLET TO A RESERVOIR, WHEREIN THE RESERVOIR COUPLES THE INNER SURFACE OF THE CARRIAGE WITH THE PIVOT-BEARING ASSEMBLY, THEREBY PROVIDING A LIGHT BONDING OF THE CARRIAGE WITH THE PIVOT-BEARING ASSEMBLY
514

↓

CURES THE TACK ADHESIVE INJECTED INTO THE INTEGRATED PIVOT-CARRIAGE
516

↓

WHILE THE INTEGRATED PIVOT-CARRIAGE REMAINS HORIZONTALLY SECURED, INJECTS FROM A POSITION ABOVE THE INTEGRATED PIVOT-CARRIAGE AN AMOUNT OF THE BONDING ADHESIVE INTO EACH OF THE PIVOT-BONDING ADHESIVE DISPENSERS
518

↓

CURES THE INJECTED BONDING ADHESIVE, THEREBY PROVIDING A SECURE BONDING OF THE CARRIAGE WITH THE PIVOT-BEARING ASSEMBLY
520

INTEGRATED PIVOT-CARRIAGE FOR IMPROVING PIVOT BONDING PROCESS

FIELD OF THE INVENTION

The present technology relates generally to the hard disk drive field.

BACKGROUND

The magnetic-recording, hard-disk-drive (HDD) industry is extremely competitive. The demands of the market for ever increasing storage capacity, storage speed, and other enhancement features compounded with the desire for low cost creates tremendous pressure for manufacturing economies. Therefore, any cost savings that can be found in the manufacturing process attracts significant attention on the part of engineers assigned the task of manufacturing these complex devices.

One area of the manufacturing process where considerable economies can be made is in the reduction of the number of parts used in the HDD. Therefore, engineers are constantly striving to find more elegant and efficient designs both to reduce the number of parts, and the attending assembly costs associated with those parts, and to improve the quality of the assembled HDD, which often results when fewer parts are incorporated in an HDD design that otherwise might introduce other sources of failure. Therefore, lowering the cost of HDDs and improving the reliability of HDDs through innovations directed towards more elegant and efficient designs with fewer parts are of paramount importance for maintaining a competitive edge in the HDD manufacturing business.

DESCRIPTION OF THE DRAWINGS

FIG. 5 is a flow diagram of a method for manufacturing an integrated pivot-carriage for improving a pivot bonding process for a hard disk drive, in accordance with embodiments of the present technology.

Figure 1:
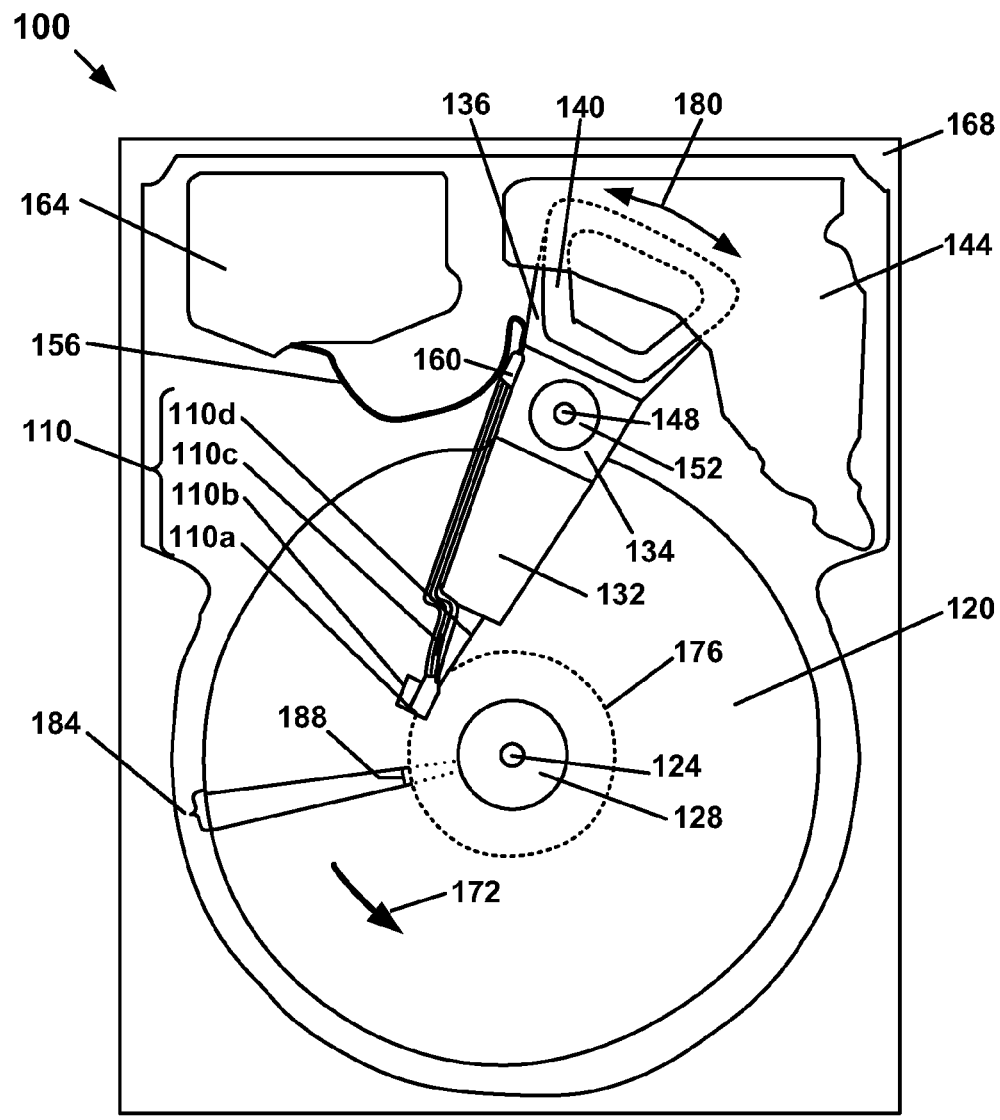
FIG. 1 is a plan view of a hard-disk drive (HDD) illustrating the functional arrangement of components of the HDD, in accordance with embodiments of the present technology.

The drawings referred to in this description should not be understood as being drawn to scale unless specifically noted.

DESCRIPTION OF EMBODIMENTS

Reference will now be made in detail to embodiments of the present technology, examples of which are illustrated in the accompanying drawings. While the technology will be described in conjunction with various embodiment(s), it will be understood that they are not intended to limit the present technology to these embodiments. On the contrary, the present technology is intended to cover alternatives, modifications and equivalents, which may be included within the spirit and scope of the various embodiments as defined by the appended claims.

Furthermore, in the following detailed description, numerous specific details are set forth in order to provide a thorough understanding of the present technology. However, the present technology may be practiced without these specific details. In other instances, well known methods, procedures, components, and circuits have not been described in detail as not to unnecessarily obscure aspects of the present embodiments.

The discussion will begin with a brief overview of the general process for providing pivot bonding of the pivot-bearing assembly with the carriage and the limitations associated therewith. The discussion will then focus on embodiments of the present technology that provide an integrated pivot-carriage for improving the pivot bonding process for a hard disk drive.

Overview

In general, a variety of methods exist for coupling a pivot-bearing assembly with a carriage. One such method involves using screws to attach the pivot-bearing assembly with the carriage. Another method involves using fewer parts, thereby saving resources. For example, bonding glue is dispensed into the middle of a reservoir that is bounded on one side by the inner surface of the carriage and on the other side by the pivot-bearing assembly. Of note, the pivot-bearing assembly includes an upper and a lower bearing coupled together with a pivot-bearing spacer positioned there between. The middle part of the reservoir has a greater width than the reservoir's end sections. Once the bonding glue is dispensed into the middle section of the reservoir, the bonding glue is expected to disperse and fill both end sections of the reservoir. If the bonding glue does in fact fully accomplish flowing to and filling the thin gap area between the carriage and upper and lower bearings of the pivot-bearing assembly at both ends of the reservoir, then the carriage becomes properly bonded to the upper and lower bearings of the pivot-bearing assembly. Bonding the upper and lower bearing of the pivot-bearing assembly to the carriage at thin gap area between the carriage and upper and lower bearings creates a stiffer bond than bonding just the pivot-bonding spacer and the carriage. A stiffer bond provides for a stiff interface between the carriage and the pivot-bearing assembly, thereby providing for more accurate tracking.

However, frequently the bonding glue fails to reach the thin gap area between the carriage and upper and lower bearings of the pivot-bearing assembly at the end portions of the reservoir, thereby creating a "soft" interface between the pivot-bearing assembly and the carriage and reducing tracking accuracy. A soft interface may result in yield losses during the manufacturing process due to drive performance degradation, or even lead to potential reliability problems after product delivery. The classic signature of these problems is significant change of HAA dynamic response to VCM excitations, when accessing a track through the servo-feedback system that controls the VCM. This change of HAA response leads to unexpected vibrations when positioning a magnetic-recording head over a sought-after track during a seek operation controlled by the servo electronics, therefore results in significant drive performance degradation such as longer settling time to a sought-after track, or even servo instability, for reading and writing operations.

A number of methods are used to overcome these limitations due to improper bonding by enabling the bonding glue to reach the thin gap area between the carriage and upper and lower bearings of the pivot-bearing assembly at reservoir's end portions. For example, a higher viscosity glue is sometimes used. Alternatively, a greater amount of low viscosity bonding glue per unit may be used. However, a higher volume of bonding glue being dispensed into the reservoir sometimes leads to leakage from the reservoir caused by overfill, causing the pivot to become stuck. Further, certain tools in the manufacturing line are sometimes used to overcome an anticipated soft interface. However, the use of more tools causes a higher manufacturing cycle time, and thus a lower through put in the manufacturing line.

Embodiments of the present technology provide for an integrated pivot-carriage for a hard disk drive (HDD) for improving a pivot bonding process that provides a stiffer interface between the carriage and the pivot-bearing assembly. Embodiments provide for dispensing bonding glue directly to the thin gap area between the carriage and upper and lower bearings of the pivot-bearing assembly, at which points the bonding glue is needed to maintain the proper stiffness in the pivot/carriage interface. Direct application of the bonding glue to these critical points enables a smaller quantity of glue per unit to be used for bonding the carriage to the pivot-bearing assembly, a faster manufacturing cycling time, an enhanced process robustness and yield, as well as a more desired actuator dynamic performance that avoids errors due to unexpected vibrations associated with an improper bonding of the pivot-bearing assembly and the carriage.

The following discussion will begin with a description of the structure of the components of the present technology, beginning with the general description of the hard disk drive components. This discussion will then be followed by a description of the components in operation.

Structure

With reference to FIG. 1, in accordance with an embodiment of the present invention, a plan view of a HDD 100 is shown. FIG. 1 illustrates the functional arrangement of an integrated pivot-carriage 300A and 300B (see FIGS. 3A and 3B) with respect to other components of the HDD 100. The HDD 100 includes at least one HGA 110 including a magnetic-recording head 110a, a lead suspension 110c attached to the magnetic-recording head 110a, and a load beam 110d attached to a slider 110b, which includes the magnetic-recording head 110a at a distal end of the slider 110b; the slider 110b is attached at the distal end of the load beam 110d to a gimbal portion of the load beam 110d. The HDD 100 also includes at least one magnetic-recording disk 120 rotatably mounted on a spindle 124 and a drive motor (not shown) attached to the spindle 124 for rotating the magnetic-recording disk 120. The magnetic-recording head 110a includes a write element, a so-called writer, and a read element, a so-called reader, for respectively writing and reading information stored on the magnetic-recording disk 120 of the HDD 100. The magnetic-recording disk 120 or a plurality (not shown) of magnetic-recording disks may be affixed to the spindle 124 with a disk clamp 128. The HDD 100 further includes an arm 132 attached to the HGA 110, a carriage 134, a voice-coil motor (VCM) that includes an armature 136 including a voice coil 140 attached to the carriage 134; and a stator 144 including a voice-coil magnet (not shown); the armature 136 of the VCM is attached to the carriage 134 and is configured to move the arm 132 and the HGA 110 to access portions of the magnetic-recording disk 120 being mounted on a pivot-shaft 148 with an interposed pivot-bearing assembly 152.

With further reference to FIG. 1, in accordance with an embodiment of the present invention, electrical signals, for example, current to the voice coil 140 of the VCM, write signal to and read signal from the magnetic-recording head 110a, are provided by a flexible cable 156. Interconnection between the flexible cable 156 and the magnetic-recording head 110a may be provided by an arm-electronics (AE) module 160, which may have an on-board pre-amplifier for the read signal, as well as other read-channel and write-channel electronic components. The flexible cable 156 is coupled to an electrical-connector block 164, which provides electrical communication through electrical feedthroughs (not shown) provided by an HDD housing 168. The HDD housing 168, also referred to as a casting, depending upon whether the HDD housing is cast, in conjunction with an HDD cover (not shown) provides a sealed, protective enclosure for the information storage components of the HDD 100.

With further reference to FIG. 1, in accordance with an embodiment of the present invention, other electronic components (not shown), including a disk controller and servo electronics including a digital-signal processor (DSP), provide electrical signals to the drive motor, the voice coil 140 of the VCM and the magnetic-recording head 110a of the HGA 110. The electrical signal provided to the drive motor enables the drive motor to spin providing a torque to the spindle 124 which is in turn transmitted to the magnetic-recording disk 120 that is affixed to the spindle 124 by the disk clamp 128; as a result, the magnetic-recording disk 120 spins in a direction 172. The spinning magnetic-recording disk 120 creates a cushion of air that acts as an air bearing on which the air-bearing surface (ABS) of the slider 110b rides so that the slider 110b flies above the surface of the magnetic-recording disk 120 without making contact with a thin magnetic-recording medium of the magnetic-recording disk 120 in which information is recorded. The electrical signal provided to the voice coil 140 of the VCM enables the magnetic-recording head 110a of the HGA 110 to access a track 176 on which information is recorded. Thus, the armature 136 of the VCM swings through an arc 180 which enables the HGA 110 attached to the armature 136 by the arm 132 to access various tracks on the magnetic-recording disk 120. Information is stored on the magnetic-recording disk 120 in a plurality of concentric tracks (not shown) arranged in sectors on the magnetic-recording disk 120, for example, sector 184. Correspondingly, each track is composed of a plurality of sectored track portions, for example, sectored track portion 188. Each sectored track portion 188 is composed of recorded data and a header containing a servo-burst-signal pattern, for example, an ABCD-servo-burst-signal pattern, information that identifies the track 176, and error correction code information. In accessing the track 176, the read element of the magnetic-recording head 110a of the HGA 110 reads the servo-burst-signal pattern which provides a position-error-signal (PES) to the servo electronics, which controls the electrical signal provided to the voice coil 140 of the VCM, enabling the magnetic-recording head 110a to follow the track 176. Upon finding the track 176 and identifying a particular sectored track portion 188, the magnetic-recording head 110a either reads data from the track 176 or writes data to the track 176 depending on instructions received by the disk controller from an external agent, for example, a microprocessor of a computer system.

Embodiments of the present invention also encompass a HDD 100 that includes the HGA 110, the magnetic-recording disk 120 rotatably mounted on the spindle 124, the arm 132 attached to the HGA 110 and the integrated pivot-carriage 300A, 300B (see FIGS. 3A and 3B) attached to the arm 132. Therefore, embodiments of the present invention incorporate within the environment of the HDD 100, without limitation, the subsequently described embodiments of the present invention for the integrated pivot-carriage 300A, 300B (see FIGS. 3A and 3B) as further described in the following discussion.

Figure 2:
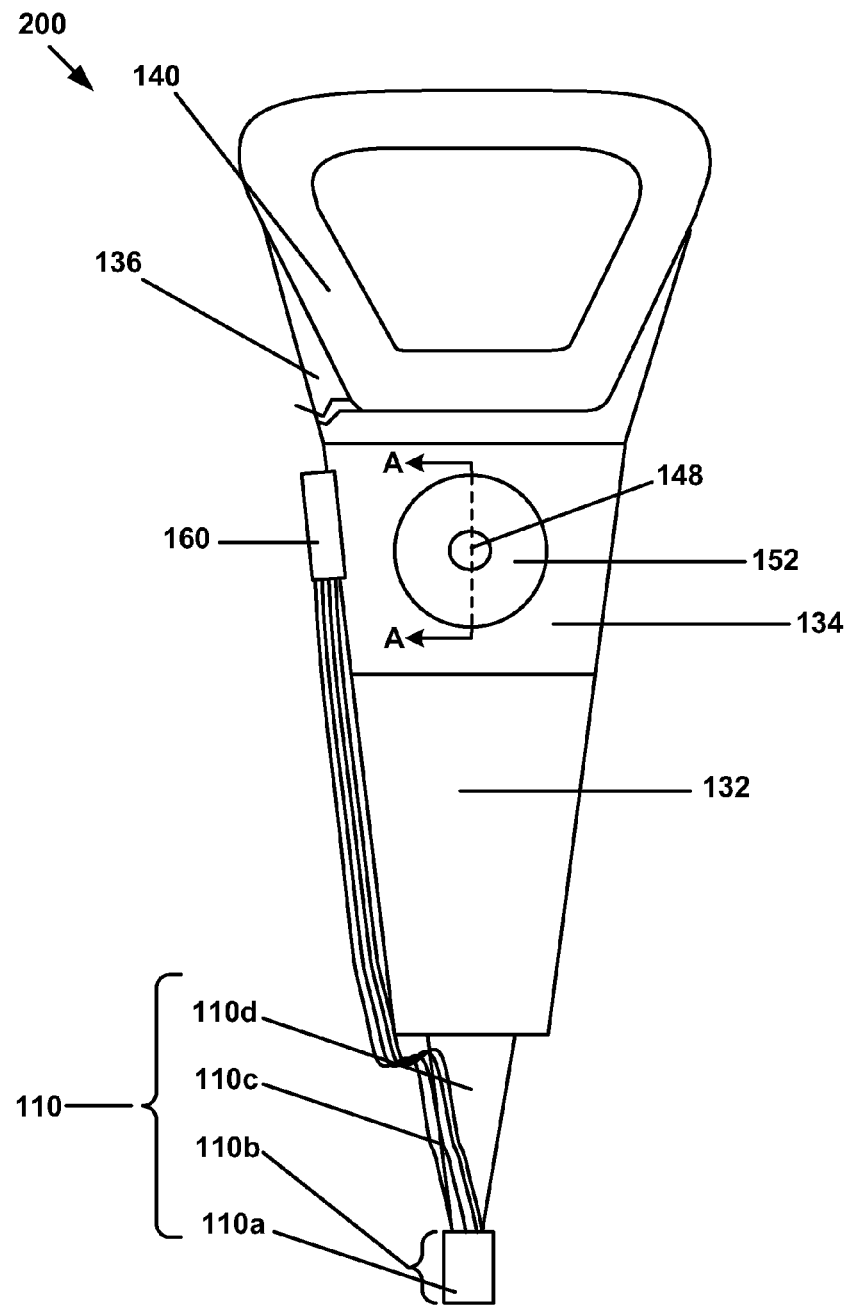
FIG. 2 is a plan view of a head-arm-assembly (HAA) illustrating the functional arrangement of components of the HAA with respect to an integrated pivot-carriage, in accordance with embodiments of the present technology.

With reference now to FIG. 2, in accordance with an embodiment of the present invention, a plan view of a head-arm-assembly (HAA) is shown. FIG. 2 illustrates the functional arrangement of the HAA with respect to the integrated pivot-carriage 300A, 300B (see FIGS. 3A and 3B). The HAA includes the HGA 110 and the arm 132. The HAA is attached at the arm 132 to the carriage 134. In the case of an HDD having multiple disks, or platters as disks are sometimes referred to in the art, the carriage 134 is called an "E-block," or comb, because the carriage is arranged to carry a ganged array of arms that gives it the appearance of a comb. As shown in FIG. 2, the armature 136 of the VCM is attached to the carriage 134 and the voice coil 140 is attached to the armature 136. The AE 160 may be attached to the carriage 134 as shown. The carriage 134 is mounted on the pivot-shaft 148 with the interposed pivot-bearing assembly 152. The line labeled AA designates the location of a cutting plane used to illustrate a detailed configuration of the integrated pivot-carriage 300A, 300B shown in FIGS. 3A and 3B, respectively, as will be described herein.

Figure 3A:
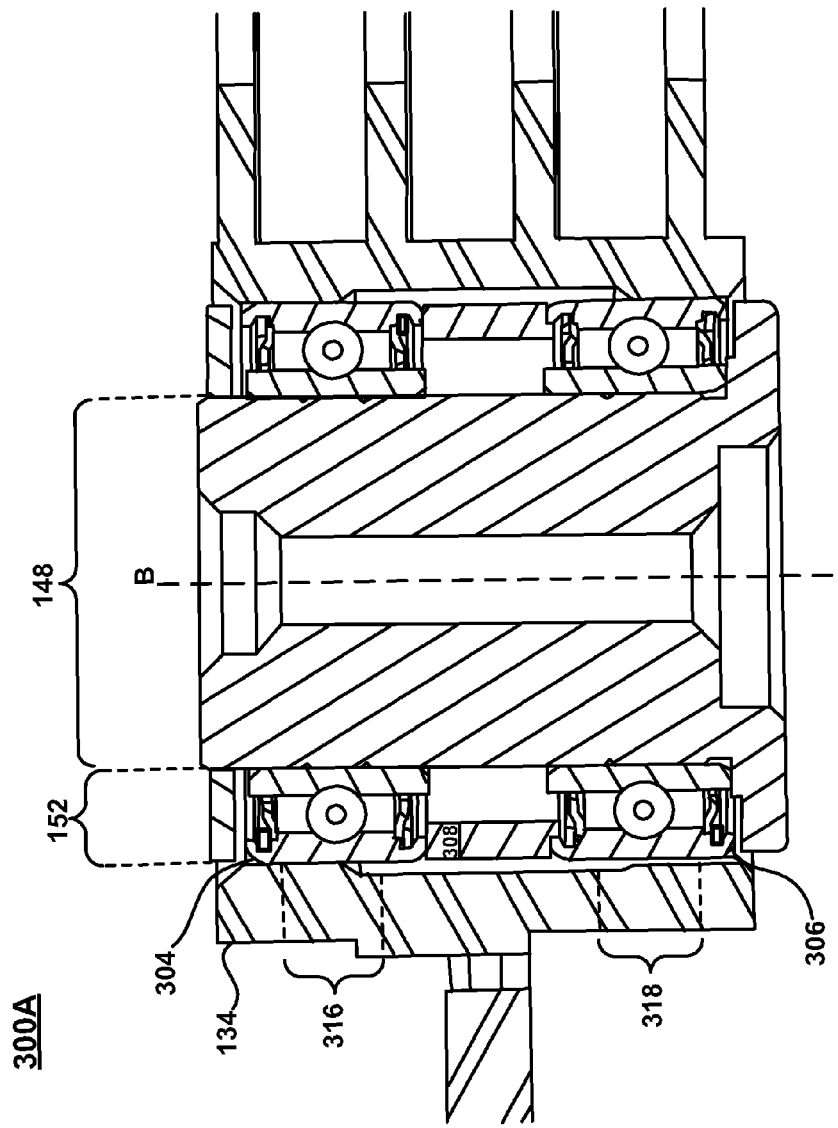
FIG. 3A is cross-sectional view of an integrated pivot-carriage illustrating the functional arrangement of components of the integrated pivot-carriage in accordance with embodiments of the present technology.
Figure 3B:
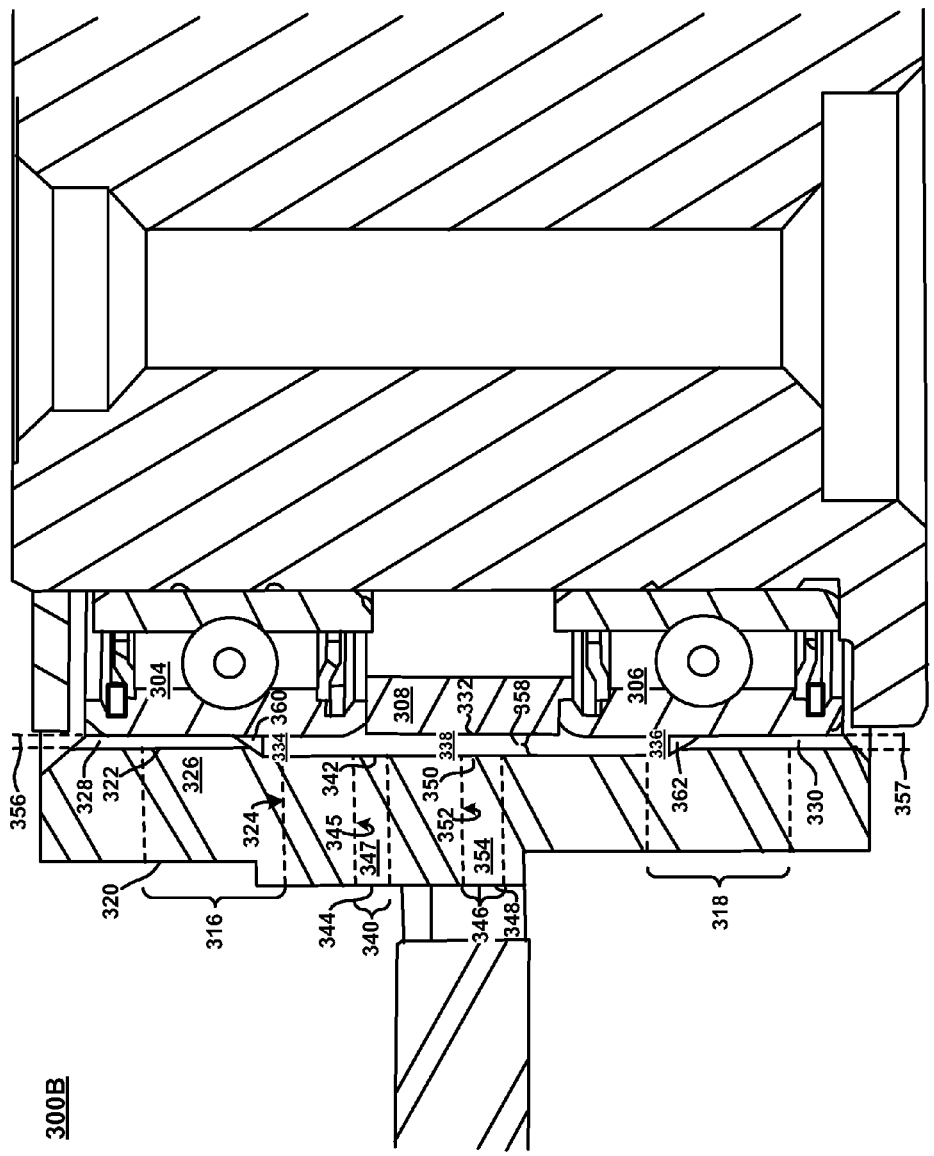
FIG. 3B is an enlarged cross-sectional view of a portion of the integrated pivot-carriage of FIG. 3A, illustrating the functional arrangement of components of the integrated pivot-carriage, in accordance with embodiments of the present technology.
Figure 4:
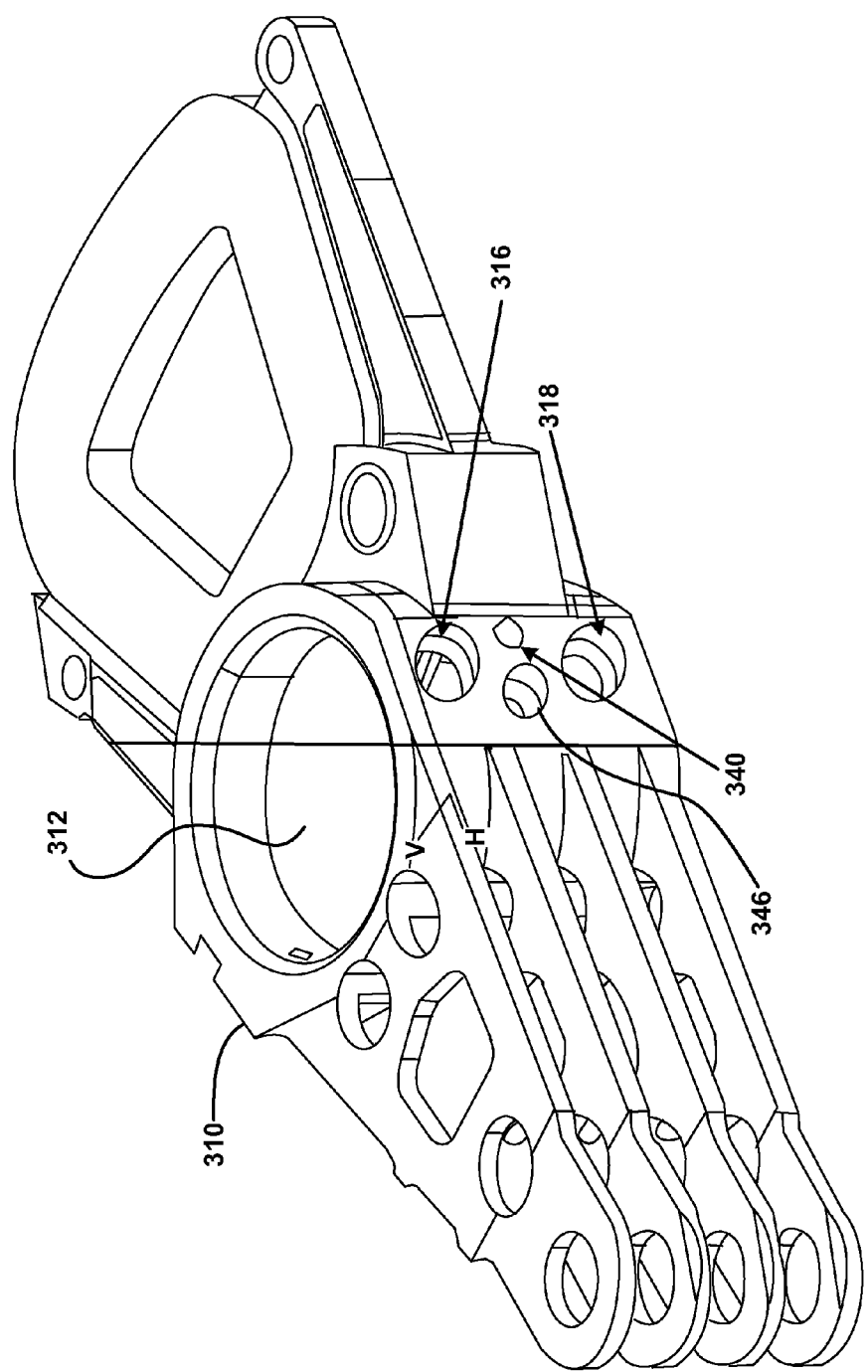
FIG. 4 is a perspective view of the carriage of the integrated pivot-carriage illustrating the functional arrangement of components of the carriage, in accordance with embodiments of the present technology.

With reference now to FIG. 3A, in accordance with embodiments of the present technology, a cross-sectional view of the integrated pivot-carriage 300A is shown. The cross-sectional view of the integrated pivot-carriage 300A corresponds with the line labeled AA of FIG. 2 that designates the location of the cutting plane of the cross-sectional view. FIG. 3A illustrates the functional arrangement of components of the integrated pivot-carriage 300A. FIG. 3B, in accordance with embodiments of the present technology, shows 300B, an enlarged cross-sectional view of a portion of the integrated pivot-carriage 300A of FIG. 3A. FIG. 4, in accordance with embodiments of the present technology, shows a perspective view of a carriage of the integrated pivot-carriage.

Referring now to FIGS. 3A, 3B and 4, the integrated pivot-carriage 300A and 300B of the HDD 100 includes the carriage 134 and the pivot-shaft 148 and the pivot-bearing assembly 152. The carriage 134 includes a center-bore 312 (shown in FIG. 4). As shown in FIGS. 3A and 3B, the pivot-shaft 148 and the pivot-bearing assembly 152 fill portions of the center-bore 312 in the carriage 134.

With further reference to FIGS. 3A, 3B and 4, in accordance with embodiments of the present invention, portions of the integrated-pivot carriage 300A and 300B have a central axis of symmetry designated by center-line BB in FIGS. 3A and 3B. It should be appreciated that the outer rounded surface of the pivot-shaft 148 and the inner rounded surface of the center-bore 312 of the carriage 134 of the integrated pivot-carriage 300A, 300B are substantially circularly symmetric about center-line BB. As used herein, "substantially circularly symmetric" means that points on the outer rounded surface of the pivot-shaft 148 and similarly for points on the inner rounded surface of the center-bore 312 of the carriage 134, that are disposed on opposite sides of the center-line BB along a perpendicular to and through the center-line BB, are symmetrically disposed at about equal distances with respect to the center-line BB, so far as is possible within manufacturing tolerances. Thus, corresponding to the left-hand-side pivot-bearing spacer 308 shown in FIG. 3B, there is a symmetrically disposed right-hand-side portion of the integrated pivot-bearing spacer 308 on the opposite side of the pivot-shaft 148 at an equal distance from the center-line BB such that the pivot-bearing spacer 308 may have the shape of an annular cylinder, for example, a cylinder with a concentric hole in the center. In like fashion, the pivot-shaft 148 is disposed relative to the center-line BB such that the pivot-shaft 148 includes a rod-shaped, or bar, portion that may have the shape of a cylinder, and a flanged portion at the bottom of the pivot-shaft 148 that may have the shape of an annular cylinder. Similar considerations with respect to circular symmetry would apply to the structure and design of an upper shield portion and a lower shield portion of the pivot-bearing assembly 152, as shown in FIG. 3A, that also may have the shape of annular cylinders.

Referring still to FIGS. 3A, 3B and 4, embodiments of the present technology include a pivot-bearing assembly 152, a carriage 134 and a plurality of adhesive receiving regions 328 and 330 (328 and 330 are previously referred to as the thin gap area between the carriage and upper and lower bearings of the pivot-bearing assembly at the end portions of the reservoir). More particularly, the pivot-bearing assembly 152 comprises an upper bearing 304, a lower bearing 306 and a pivot-bearing spacer 308 there between. Although only two adhesive receiving regions 328 and 330 are shown, it should be appreciated that more than two adhesive receiving regions may be included in embodiments of the present technology.

The carriage 134 includes a center-bore 312 and a plurality of pivot-bonding adhesive dispensers 316 and 318. Although only two pivot-bonding adhesive dispensers 316 and 318 are shown, it should be appreciated that more than two pivot-bonding adhesive dispensers may be included in embodiments of the present technology. The center-bore 312 has a pivot-shaft 148 coupled with the pivot-bearing assembly 152 disposed within.

Each of the plurality of pivot-bonding adhesive dispensers 316 and 318 comprises an adhesive inlet 320, an adhesive outlet 322 and an enclosing wall 324 defining an interior flow passage 326 between the adhesive inlet 320 and the adhesive outlet 322. The interior flow passage 326 is configured for conveying adhesive there through.

In one embodiment, the adhesive used is bonding glue. In one embodiment, the bonding glue is of a commercial grade. Functional aspects of embodiments of the present technology enable low viscosity bonding glue to be employed.

Each of the plurality of adhesive receiving regions 328 and 330 couple the adhesive inlet 320 with a bearing of the upper and lower bearing, 304 and 306, respectively. The plurality of adhesive receiving regions 328 and 330 are configured for receiving the adhesive dispensed thereto, thereby bonding the pivot-bearing assembly 152 with the carriage 134 (or 310 of FIG. 4).

In one embodiment, the integrated pivot-carriage 300A and 300B further includes a reservoir 332 having a first and a second end, 334 and 336, respectively. The first and second end 334 and 336, respectively, are coupled with the first and second adhesive receiving regions 328 and 330, respectively. The reservoir 332 defines an area 338 between the carriage 310 and the pivot-bearing spacer 308. In one embodiment, the adhesive receiving regions 328 and 330 define a gap 356 and 357, respectively, that is about seven micrometers wide. However, it should be appreciated that the gaps 356 and 357 may be more or less than seven micrometers wide. In fact, gaps 356 and 357 may be any size that is large enough to allow the pivot-bearing assembly 152 to be inserted into the center-bore 312. Prior designs provide that adhesive be injected into area 338 of the reservoir 332. From the reservoir 332, the adhesive would wick into the gaps 356 and 357 of adhesive receiving regions 328 and 330, respectively. However, in some cases the adhesive would stop at the pivot-bearing spacer 308 before reaching the adhesive receiving regions 328 and 330 due to surface discontinuity. This results in a poor bond and thus a soft interface.

Of note, FIGS. 3A and 3B show the pivot-bonding adhesive dispensers 316 and 318 covering a portion of the reservoir 332. By covering a portion of the reservoir, the pivot-bonding adhesive dispensers 316 and 318 enable the faster dispensing of adhesive. The adhesive will touch the adhesive receiving regions 328 and 330 and then migrate to the full extent of adhesive receiving regions 328 and 330 by meniscus force. While this migration is occurring, the remaining amount of adhesive needed for bonding will first flow into the reservoir 332, and then gradually be pulled into adhesive receiving regions 328 and 330 by meniscus force. The first and second chamfered elements 360 and 362 are shallow-angled to help meniscus force direct the low viscosity adhesive to flow into the adhesive receiving regions 328 and 330 from reservoir 332.

In one embodiment, the carriage 134 (or 310 of FIG. 4) of the integrated pivot-carriage 300A, 300B further includes an air dispenser 340. The air dispenser 340 is also known as a breathing hole. In one embodiment, the air dispenser 340 includes an air inlet 342 that is coupled with the reservoir 332, an air outlet 344 and an enclosing wall 345 defining an interior flow passage 347 between the air inlet 342 and the air outlet 344. The interior flow passage 347 is configured for conveying air there through from the reservoir 332 to the air outlet 344. Functionally, once adhesive is injected into the plurality of adhesive receiving regions 328 and 330, the air is pushed out of the plurality of adhesive receiving regions 328 and 330 and into the connected reservoir 332. As more adhesive is dispensed into the plurality of adhesive receiving regions 328 and 330, the more air is squeezed into the reservoir 332, and hence out the air outlet 344 of the reservoir 332. Thus, the presence of the air dispenser 340 enables the adhesive to become dispersed within the plurality of adhesive receiving regions 328 and 330, and into the reservoir 332 (for overflow). Furthermore, it should be noted that embodiments of the present technology may function without a an air dispenser 340 (breathing hole).

In one embodiment, the carriage 134 of the integrated pivot-carriage 300A, 300B further includes a tack dispenser 346. In embodiments of the present technology, the tack dispenser 346 includes a tack inlet 348, a tack outlet 350 coupled with the reservoir 332 and an enclosing wall 352 that defines a tack interior flow passage 354 between the tack inlet 348 and the tack outlet 350. The tack interior flow passage 354 is configured for conveying tack glue there through from the tack inlet 348 to the reservoir 332, thereby bonding the carriage 310 with the pivot-bearing assembly 152. In embodiments of the present technology, the tack is used to lightly bond the carriage 134 to the pivot-bearing assembly 152 while the adhesive injected into the plurality of pivot-bonding adhesive dispensers 316 and 318 cures and provides a stronger bond. It should also be noted that embodiments of the present technology may function without a tack dispenser 346. For example, a fixture holding the pivot bearing assembly 152 in place may be utilized, instead of, or in addition to, tack.

In one embodiment, each of the adhesive receiving regions 328 and 330 include a gap 356, 357 that is smaller than the gap 358 of the reservoir 332. In another embodiment, the gap 356, 357 of each of the adhesive receiving regions 328 and 330, respectively, is at least a few micrometers wide.

In one embodiment, the first and second end 334 and 336, respectively, of the reservoir 332 include a first and second chamfered element 360 and 362, respectively. The first and second chamfered element 360 and 362, respectively, are configured for directing adhesive from the reservoir 332 to the adhesive receiving regions 328 and 330 by meniscus force. The chamfers on the outer ends of the adhesive receiving regions 328 and 330 (opposite end of the adhesive receiving regions 328 and 330 as the first and second chamfered elements 360 and 362, respectively) provide resistance from the leaking of adhesive into the outer side of the upper and lower bearings, 304 and 306, respectively.

Referring still to FIGS. 1, 2, 3A, 3B and 4, in one embodiment, a HDD 100 includes a head-gimbal assembly 110 that includes a magnetic-recording head 110a, a load beam 110d attached at a gimbal portion of the load beam 110d to a slider 110b including the magnetic-recording head 110a, a magnetic-recording disk 120 rotatably mounted on a spindle 124, an arm 132 attached to the head-gimbal assembly 110, and the integrated pivot-carriage 300A, 300B described herein attached to the arm 132.

Thus, embodiments of the present technology enable the injection of pivot bonding glue directly to the thin gap area between the pivot and the carriage assembly, thereby providing a desired stiffness in the pivot/carriage interface.

Operation

FIG. 5 is a flow diagram of a method 500 for manufacturing an integrated pivot-carriage 300A, 300B for improving a pivot bonding process for an HDD 100, in accordance with embodiments of the present technology. At 502, the method 500 includes providing a carriage 134 including a center-bore 312 and machining 504 a plurality of pivot-boding adhesive dispensers 316 and 318, as described herein, onto the carriage 134.

At 506, a tack dispenser 346, as described herein, is machined. At 508, a pivot-shaft 314 with a pivot-bearing assembly 152, as described herein, is provided. At 510, the pivot-shaft 314 coupled with the pivot-bearing assembly 152 is placed within the center-bore 312 such that the adhesive outlet 322 of each of the pivot-bonding adhesive dispensers 316 and 318 is aligned above each of the plurality of adhesive receiving regions 328 and 330 and a portion of the reservoir 332, as described herein.

At 512, the integrated pivot-carriage 300A, 300B is secured in a horizontal position such that the tack inlet 348 of each of the plurality of pivot-bonding adhesive dispensers 316 and 318 is facing upwards. By being positioned horizontally, the tack that is being injected into the tack dispenser 346 is able to utilize gravity to flow downwards and hence through the tack interior flow passage 354 more quickly and easily. This saves time and thus resources, as well as allowing the tack to more thoroughly become distributed within the reservoir 332.

Thus, and referring to 514 of method 500, from a position above the integrated pivot-carriage 300A, 300B, an amount of tack is injected into the tack dispenser 346, such that the tack flows through the tack interior flow passage 354 from the tack inlet 348 to the reservoir 332, thereby providing a light bonding of the carriage 134 with the pivot-bearing assembly 152. At 516, the tack that is injected into the tack dispenser 346 is cured.

At 518, the integrated pivot-carriage 300A, 300B remains horizontally secured from step 512, and an amount of bonding adhesive is injected from a position above the integrated pivot-carriage into each of the plurality of pivot-bonding adhesive dispensers 316 and 318. Further, at 520, the bonding adhesive is cured, thereby providing a secure bonding of the carriage 134 with the pivot-bearing assembly 152. As with the tack, the bonding adhesive is dispensed into the integrated pivot-carriage 300A, 300B while it is in a horizontal position and the plurality of pivot-bonding adhesive dispensers 316 and 318 are facing upwards. As described herein, this enables gravity to help the bonding adhesive to flow downwards and hence through the interior flow passage 326 of each of the plurality of pivot-bonding adhesive dispensers 316 and 318 more quickly and easily. Thus, the bonding adhesive becomes more thoroughly distributed within each of the plurality of adhesive receiving regions 328 and 330.

All statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. The scope of the present invention, therefore, is not intended to be limited to the exemplary embodiments shown and described herein. Rather, the scope and spirit of present invention is embodied by the appended claims.

What is claimed is:

1. An integrated pivot-carriage for a hard disk drive for improving a pivot bonding process comprising:
   a pivot-bearing assembly comprising an upper bearing, a lower bearing and a pivot-bearing spacer there between;
   a carriage comprising:
      a center-bore within which a pivot-shaft coupled with said pivot-bearing assembly is disposed; and
      a plurality of pivot-bonding adhesive dispensers, each of said pivot-bonding adhesive dispensers comprising:
         an adhesive inlet;
         an adhesive outlet; and
         an enclosing wall defining an interior flow passage between said adhesive inlet and said adhesive outlet, said interior flow passage configured for conveying bonding adhesive there through; and
      a plurality of adhesive receiving regions, each of said plurality of adhesive receiving regions coupling said adhesive outlet with a portion of a bearing of said upper and said lower bearing, said plurality of adhesive receiving regions configured for receiving said bonding adhesive dispensed thereto, thereby bonding said pivot-bearing assembly with said carriage.

2. The integrated pivot-carriage of claim 1, further comprising:
   a reservoir having a first and second end coupled with a first and second adhesive receiving region, respectively, of said plurality of adhesive receiving regions, said reservoir defining an area between said carriage and said pivot-bearing spacer.

3. The integrated pivot-carriage of claim 1, wherein said each of said plurality of adhesive receiving regions comprises a gap that is smaller than a gap of said reservoir.

4. The integrated pivot-carriage of claim 1, wherein a gap of said each of said plurality of adhesive receiving regions is at least large enough to allow said pivot-bearing assembly to be inserted into said center-bore.

5. The integrated pivot-carriage of claim 2, wherein said carriage further comprises:
   an air dispenser comprising:
      an air inlet coupled with said reservoir;
      an air outlet; and
      an enclosing wall defining an interior flow passage between said air inlet and said air outlet, said interior flow passage configured for conveying air there through from said reservoir to said air outlet.

6. The integrated pivot-carriage of claim 2, wherein said carriage further comprises:
   a tack dispenser comprising:
      a tack inlet;
      a tack outlet coupled with said reservoir; and
      an enclosing wall defining a tack interior flow passage between said tack inlet and said tack outlet, said tack interior flow passage configured for conveying tack adhesive there through from said tack inlet to said reservoir, thereby bonding said carriage with said pivot-bearing assembly.

7. The integrated pivot-carriage of claim 2, wherein said first and second end of said reservoir comprises a first and second chamfered element, respectively, said first and second chamfered element configured for directing bonding adhesive from said reservoir to each of said first and second adhesive receiving region by meniscus force.

8. A hard-disk drive comprising:
   a head-gimbal assembly comprising:
      a magnetic-recording head; and
      a load beam attached at a gimbal portion of said load beam to a slider including said magnetic-recording head;
   a magnetic-recording disk rotatably mounted on a spindle;
   an arm attached to said head-gimbal assembly; and
   an integrated pivot-carriage attached to said arm comprising:
      a pivot-bearing assembly comprising an upper bearing, a lower bearing and a pivot-bearing spacer there between;
      a carriage comprising:
         a center-bore within which a pivot-shaft coupled with said pivot-bearing assembly is disposed; and
         a plurality of pivot-bonding adhesive dispensers, each of said pivot-bonding adhesive dispensers comprising:
            an adhesive inlet;
            an adhesive outlet; and
            an enclosing wall defining an interior flow passage between said adhesive inlet and said adhesive outlet, said interior flow passage configured for conveying bonding adhesive there through; and
         a plurality of adhesive receiving regions, each of said plurality of adhesive receiving regions coupling said adhesive outlet with a portion of a bearing of said upper and said lower bearing, said plurality of adhesive receiving regions configured for receiving said bonding adhesive dispensed thereto, thereby bonding said pivot-bearing assembly with said carriage.

9. The hard-disk drive recited in claim 8, further comprising:
   a reservoir having a first and second end coupled with a first and second adhesive receiving region, respectively, of said plurality of adhesive receiving regions, said reservoir defining an area between said carriage and said pivot-bearing spacer.

10. The hard-disk drive recited in claim 8, wherein a gap of said each of said plurality of adhesive receiving regions is at least large enough to allow said pivot-bearing assembly to be inserted into said center-bore.

11. The hard-disk drive recited in claim 9, wherein said first and second adhesive receiving region comprises a gap that is smaller than a gap of said reservoir.

12. The hard-disk drive recited in claim 9, wherein said first and second end of said reservoir comprises a first and second chamfered element, respectively, said first and second chamfered element configured for directing bonding adhesive from said reservoir to each of said first and second adhesive receiving region by meniscus force.

13. The hard-disk drive recited in claim 9, wherein said carriage further comprises:
an air dispenser comprising:
an air inlet coupled with said reservoir;
an air outlet; and
an enclosing wall defining an interior flow passage between said air inlet and said air outlet, said interior flow passage configured for conveying air there through from said reservoir to said air outlet.

14. The hard-disk drive recited in claim 9, wherein said carriage further comprises:
a tack dispenser comprising:
a tack inlet;
a tack outlet coupled with said reservoir; and
an enclosing wall defining a tack interior flow passage between said tack inlet and said tack outlet, said tack interior flow passage configured for conveying tack adhesive there through from said tack inlet to said reservoir, thereby bonding said carriage with said pivot-bearing assembly.

15. The method of manufacturing an integrated pivot-carriage of a hard-disk drive for improving a pivot bonding process, said method comprising:
providing a carriage comprising a center-bore, said carriage comprising an inner surface and an outer surface; and
machining a plurality of pivot-bonding adhesive dispensers onto said carriage, each of said pivot-bonding adhesive dispensers comprising:
an adhesive inlet;
an adhesive outlet; and
an enclosing wall defining an interior flow passage between said adhesive inlet and said adhesive outlet, said interior flow passage configured for conveying bonding adhesive there through.

16. The method of claim 15, further comprises:
machining a tack dispenser comprising:
a tack inlet;
a tack outlet coupled with said reservoir; and
an enclosing wall defining a tack interior flow passage between said tack inlet and said tack outlet, said tack interior flow passage configured for conveying tack adhesive there through from said tack inlet to said reservoir, thereby bonding said carriage with said pivot-bearing assembly.

17. The method of claim 16, further comprising:
providing a pivot-shaft coupled with a pivot-bearing assembly, said pivot-bearing assembly comprising an upper bearing, a lower bearing and a pivot-bearing spacer there between;
placing within said center-bore said pivot-shaft coupled with said pivot-bearing assembly such that said adhesive outlet of said each of said pivot-bonding adhesive dispensers is aligned above each of a plurality of adhesive receiving regions, said each of said plurality of adhesive receiving regions coupling said adhesive outlet with a portion of a bearing of said upper and said lower bearing, said plurality of adhesive receiving regions configured for receiving said bonding adhesive dispensed thereto, thereby bonding said pivot-bearing assembly with said carriage.

18. The method of claim 17, further comprising:
securing said integrated pivot-carriage in a horizontal position such that said tack inlet of each of said plurality of pivot-bonding adhesive dispensers is facing upwards.

19. The method of claim 18, further comprising:
injecting, from a position above said integrated pivot-carriage, an amount of tack adhesive into said tack dispenser, such that tack adhesive flows through said tack interior flow passage from said tack inlet to a reservoir, wherein said reservoir couples said inner surface of said carriage with said pivot-bearing assembly, thereby providing a light bonding of said carriage with said pivot-bearing assembly; and
curing said tack adhesive injected into said integrated pivot-carriage.

20. The method of claim 19, further comprising:
while said integrated pivot-carriage remains horizontally secured, injecting from a position above said integrated pivot-carriage an amount of said bonding adhesive into said each of said pivot-bonding adhesive dispensers, whereby injected bonding adhesive flows through said interior flow passage to said each of said plurality of adhesive receiving regions; and
curing said injected bonding adhesive, thereby providing a secure bonding of said carriage with said pivot-bearing assembly.

* * * * *